United States Patent
Shiomi

(10) Patent No.: US 10,938,044 B2
(45) Date of Patent: Mar. 2, 2021

(54) FUEL CELL SYSTEM AND CONTROL METHOD FOR FUEL CELL SYSTEM

(71) Applicant: NISSAN MOTOR CO., LTD., Yokohama (JP)

(72) Inventor: Takeshi Shiomi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/063,442

(22) PCT Filed: Nov. 25, 2016

(86) PCT No.: PCT/JP2016/085078
§ 371 (c)(1),
(2) Date: Jun. 18, 2018

(87) PCT Pub. No.: WO2017/110367
PCT Pub. Date: Jun. 29, 2017

(65) Prior Publication Data
US 2018/0375120 A1 Dec. 27, 2018

(30) Foreign Application Priority Data
Dec. 25, 2015 (JP) .............................. JP2015-253887

(51) Int. Cl.
*H01M 8/04858* (2016.01)
*H01M 8/04537* (2016.01)
(Continued)

(52) U.S. Cl.
CPC ........... *H01M 8/0488* (2013.01); *B60L 58/40* (2019.02); *H01M 8/043* (2016.02);
(Continued)

(58) Field of Classification Search
CPC .......... B60L 58/40; H01M 2008/1293; H01M 8/04022; H01M 8/04225; H01M 8/04228;
(Continued)

(56) References Cited

U.S. PATENT DOCUMENTS 5,789,092 A     8/1998  Spiers et al.
7,564,211 B2 *  7/2009  Kazama ............ H01M 8/04007
                                                320/101
(Continued)

FOREIGN PATENT DOCUMENTS

EP   3 396 761 A1    10/2018
JP   2012-221563 A   11/2012
(Continued)

*Primary Examiner* — Victoria H Lynch
(74) *Attorney, Agent, or Firm* — Foley & Lardner LLP

(57) ABSTRACT

A control method for a fuel cell system including a solid oxide fuel cell, an anode gas and a cathode gas being supplied to the fuel cell, the fuel cell performing electric generation corresponding to a load, the fuel cell system controlling gas supply to the fuel cell and the electric generation. The control method including: an electric generating operation step of controlling flow rates of the anode gas and the cathode gas that flow into the fuel cell depending on a magnitude of the load; and a self-sustained operation step of causing the fuel cell to perform self-sustained operation when the load is equal to or less than a predetermined value. The self-sustained operation step includes a gas supply step of supplying the anode gas with a predetermined flow rate and the cathode gas with a predetermined flow rate to the fuel cell.

10 Claims, 12 Drawing Sheets

(51) Int. Cl.
*H01M 8/04014* (2016.01)
*H01M 8/04746* (2016.01)
*H01M 8/0432* (2016.01)
*H01M 8/04828* (2016.01)
*H01M 8/043* (2016.01)
*B60L 58/40* (2019.01)
*H01M 8/1231* (2016.01)
*H01M 8/04225* (2016.01)
*H01M 8/04228* (2016.01)
*H01M 8/04302* (2016.01)
*H01M 8/04303* (2016.01)
*H01M 8/04701* (2016.01)
*H01M 8/124* (2016.01)

(52) U.S. Cl.
CPC ..... *H01M 8/04022* (2013.01); *H01M 8/0432* (2013.01); *H01M 8/0494* (2013.01); *H01M 8/04225* (2016.02); *H01M 8/04228* (2016.02); *H01M 8/04302* (2016.02); *H01M 8/04303* (2016.02); *H01M 8/04559* (2013.01); *H01M 8/04619* (2013.01); *H01M 8/04701* (2013.01); *H01M 8/04753* (2013.01); *H01M 8/1231* (2016.02); *H01M 2008/1293* (2013.01); *Y02T 10/70* (2013.01)

(58) Field of Classification Search
CPC ............. H01M 8/043; H01M 8/04302; H01M 8/04303; H01M 8/0432; H01M 8/04559; H01M 8/04619; H01M 8/04701; H01M 8/04753; H01M 8/0488; H01M 8/0494; H01M 8/1231
See application file for complete search history.

(56) References Cited

U.S. PATENT DOCUMENTS

| | | |
|---|---|---|
| 2005/0112419 A1 | 5/2005 | Zheng et al. |
| 2012/0270126 A1 | 10/2012 | Matsumoto et al. |
| 2013/0344408 A1 | 12/2013 | Tatsui et al. |
| 2014/0113162 A1 | 4/2014 | Hottinen et al. |
| 2015/0255808 A1 | 9/2015 | Nakamura et al. |
| 2017/0047601 A1 | 2/2017 | Onuma et al. |

FOREIGN PATENT DOCUMENTS

| | | |
|---|---|---|
| JP | 2014-26891 A | 2/2014 |
| JP | 2014-107059 A | 6/2014 |
| JP | 2015-125828 A | 7/2015 |
| WO | WO 2015/182018 A1 | 12/2015 |

* cited by examiner

FUEL CELL SYSTEM AND CONTROL METHOD FOR FUEL CELL SYSTEM

TECHNICAL FIELD

The present invention relates to a fuel cell system that performs self-sustained operation corresponding to a load coupled to a fuel cell, and a control method for the fuel cell system.

BACKGROUND ART

US2014/0113162A1 discloses a fuel cell system that supplies a predetermined voltage to a fuel cell stack to reduce oxidation of an anode of a fuel cell at a time of an emergency stop.

SUMMARY OF INVENTION

In the fuel cell system as described above, when a state where electric power supply to a load such as a battery and an electric motor is stopped, what is called an idling stop state occurs, self-sustained operation of the fuel cell is performed so as to maintain the fuel cell at a state appropriate for electric generation. For example, in the self-sustained operation, supply of fuel to the anode is stopped to reduce unnecessary consumption of the fuel.

However, in such a configuration, since oxygen transmits from a cathode side to an anode side in the fuel cell during the self-sustained operation, an anode electrode sometimes oxidizes. Accordingly, in the state where the electric power supply from the fuel cell system to the load has been stopped, the anode electrode oxidizes, and there is concern that an electric generation performance of the fuel cell deteriorates.

The present invention has been made in view of the above-described problems, and it is an object of the present invention to provide a fuel cell system that reduces deterioration of an electric generation performance of a fuel cell caused by oxidative degradation of an anode electrode when electric power supply to a load of the fuel cell is stopped, and a control method for the fuel cell system.

Solution to Problem

According to one embodiment of this invention, a control method for a fuel cell system including a solid oxide fuel cell, an anode gas and a cathode gas being supplied to the fuel cell, the fuel cell performing electric generation corresponding to a load, the fuel cell system controlling gas supply to the fuel cell and the electric generation. The control method including: an electric generating operation step of controlling flow rates of the anode gas and the cathode gas that flow into the fuel cell depending on a magnitude of the load; and a self-sustained operation step of causing the fuel cell to perform self-sustained operation when the load is equal to or less than a predetermined value. The self-sustained operation step includes a gas supply step of supplying the anode gas with a predetermined flow rate and the cathode gas with a predetermined flow rate to the fuel cell.

DESCRIPTION OF EMBODIMENTS

Figure 1:
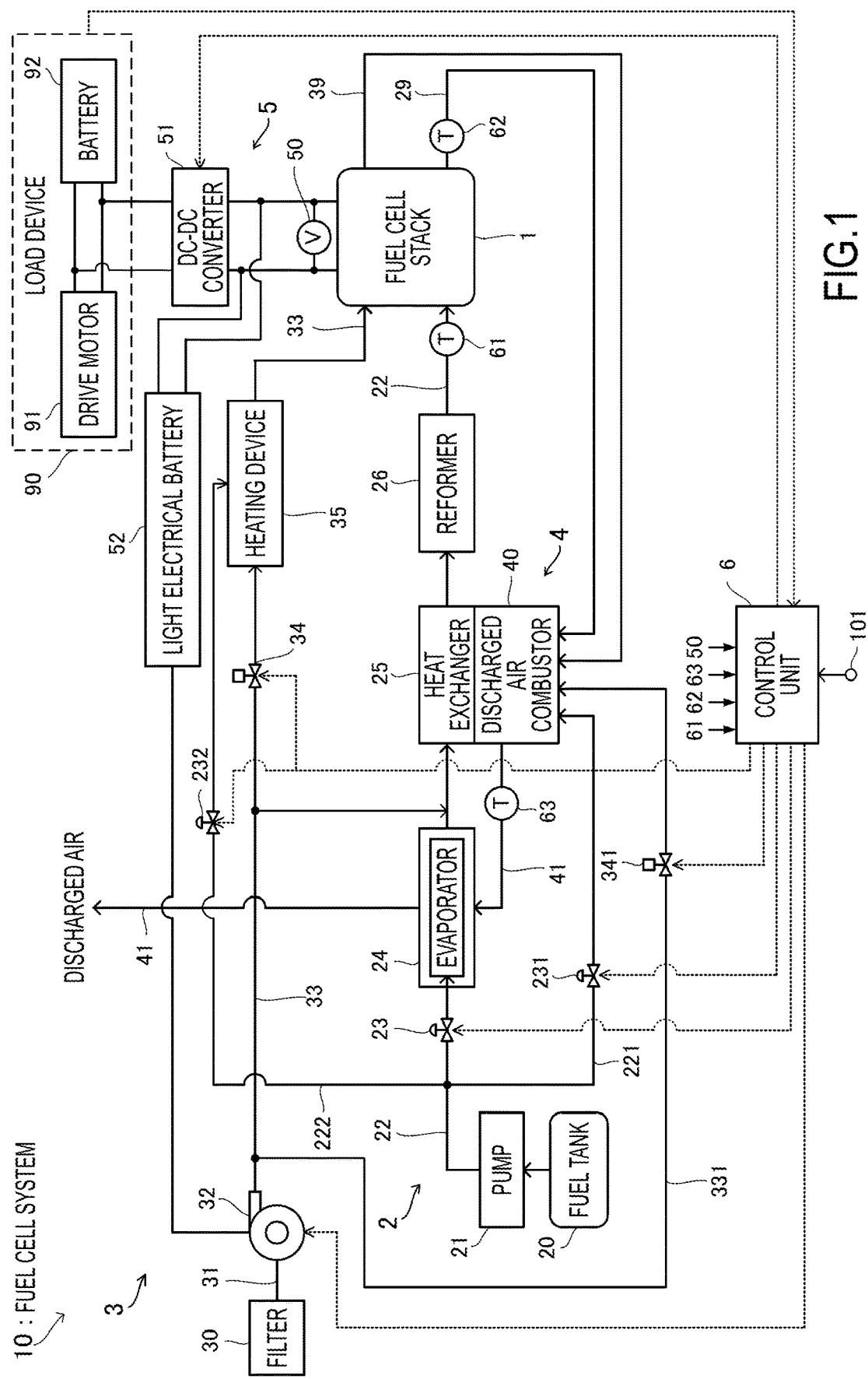
FIG. 1 is a block diagram illustrating a main configuration of a fuel cell system in a first embodiment.

The following describes embodiments of the present invention by referring to the drawings.

First Embodiment

FIG. 1 is a block diagram illustrating a main configuration of a fuel cell system 10 in a first embodiment of the present invention.

The fuel cell system 10 in this embodiment, which is a solid oxide fuel cell system, supplies electric power to a load device 90 mounted on a vehicle, in this embodiment.

The fuel cell system 10 includes a fuel cell stack 1, a fuel supply system 2, and an oxidant supply system 3. The fuel cell stack 1 generates electric power corresponding to a load. The fuel supply system 2 supplies anode gas (fuel gas) to the fuel cell stack 1. The oxidant supply system 3 supplies cathode gas (oxidant gas) to the fuel cell stack 1. Furthermore, the fuel cell system 10 includes a discharged air system 4 that discharges anode off-gas (fuel off-gas) and cathode off-gas (oxidant off-gas) that are discharged from the fuel cell stack 1 outside. The fuel cell system 10 includes an electric power supply system 5 and a control unit 6. The electric power supply system 5 supplies electric power to the external load device 90 from the fuel cell stack 1. The control unit 6 controls the whole operation in the fuel cell system 10.

The fuel cell stack 1 is a solid oxide fuel cell (SOFC). The fuel cell stack 1 is formed by stacking a plurality of cells. The cell is constituted such that an electrolyte layer made of a solid oxide such as a ceramic is interposed between an anode electrode (a fuel electrode) and a cathode electrode (an air electrode). It should be noted that a material that reacts with oxygen at high temperature is used for the anode electrode of the fuel cell stack 1. This oxidation reaction degrades a characteristic of the anode electrode, thus deteriorating an electric generation performance of the fuel cell stack 1.

The anode gas reformed by a reformer 26 is supplied to the anode electrode of the fuel cell stack 1. Air containing oxygen as the cathode gas is supplied to the cathode electrode of the fuel cell stack 1. The electric generation is performed inside the fuel cell stack 1 such that hydrogen, methane, and the like contained in the anode gas react with the oxygen contained in the cathode gas. Then, the anode off-gas and the cathode off-gas that are generated after the reaction are discharged from the fuel cell stack 1.

An anode gas supply passage 22 and an anode gas discharge passage 29 that constitute a passage for the anode gas are coupled to a manifold on the anode side formed on the fuel cell stack 1. A cathode gas supply passage 33 and a cathode gas discharge passage 39 that constitute a passage for the cathode gas are coupled to a manifold on the cathode side.

The anode gas supply passage 22 is a fuel passage that supplies the anode gas to the fuel cell stack 1. The anode gas discharge passage 29 is a path that introduces the anode off-gas discharged from the fuel cell stack 1 into a discharged air combustor 40. The cathode gas supply passage 33 is an oxidant passage that supplies the cathode gas to the fuel cell stack 1. The cathode gas discharge passage 39 is a path that introduces the cathode off-gas discharged from the fuel cell stack 1 into the discharged air combustor 40.

The fuel supply system 2 corresponds to a gas supply device that supplies the anode gas to the fuel cell stack 1. The fuel supply system 2 includes a fuel tank 20, a pump 21, the anode gas supply passage 22, a control valve 23, an evaporator 24, a heat exchanger 25, and the reformer 26.

The fuel tank 20 stores liquid containing fuel. The fuel tank 20 stores, for example, fuel for reforming containing a liquid made by mixing ethanol with water.

The pump 21 suctions the fuel to supply the fuel to the fuel supply system 2 at a constant pressure. The anode gas supply passage 22 couples the pump 21 to the fuel cell stack 1. The control valve 23, the evaporator 24, the heat exchanger 25, and the reformer 26 are arranged on the anode gas supply passage 22.

The control valve 23 includes an injection nozzle (not illustrated). When the fuel supplied from the pump 21 is supplied to this injection nozzle, the fuel is injected from the injection nozzle to the evaporator 24. The control unit 6 controls the control valve 23 to ensure control of a flow rate of the anode gas.

The evaporator 24 uses heat of the discharged gas from the discharged air combustor 40 to evaporate the fuel.

The heat exchanger 25 uses heat generation in the discharged air combustor 40 to additionally heat the evaporated fuel to a temperature configured to be reformed in the reformer 26.

The reformer 26 reforms the fuel to the anode gas by catalytic reaction to supply it to the anode electrode of the fuel cell stack 1. For example, steam reforming that reforms the fuel using water vapor is performed in the reformer 26. At least water vapor (S) of two moles (mol) per carbon (C) of one mole contained in the fuel is required to perform the steam reforming. Partial oxidation reforming that reforms the fuel by combusting the fuel using air instead of water vapor is performed in the reformer 26, in a condition where the water vapor required for the steam reforming gets low.

A temperature sensor 61 is disposed on the anode gas supply passage 22 positioned between the reformer 26 and the fuel cell stack 1.

The temperature sensor 61 detects the temperature of the anode gas supplied to the fuel cell stack 1. The temperature sensor 61 has a detected value that is hereinafter referred to as an "anode inlet temperature." The anode inlet temperature detected at the temperature sensor 61 is output to the control unit 6.

The anode gas supply passage 22 includes branch passages 221 and 222 that branch off between the pump 21 and the evaporator 24. The fuel that flows through the anode gas supply passage 22 is supplied to the discharged air combustor 40 via the branch passage 221, and supplied to a heating device 35 via the branch passage 222. It should be noted that a control valve 231 that controls the flow rate of the fuel to the discharged air combustor 40 is disposed on the branch passage 221. A control valve 232 that controls the flow rate of the fuel to the heating device 35 is disposed on the branch passage 222. The control valves 231, 232 have opening amounts controlled by the control unit 6.

The oxidant supply system 3 corresponds to a gas supply device that supplies the cathode gas to the fuel cell stack 1.

The oxidant supply system 3 includes a filter 30, an air suction passage 31, a compressor 32, the cathode gas supply passage 33, a control valve 34 for the flow rate of the cathode gas, and the heating device 35.

The filter 30 removes foreign matter of outside air to introduce this outside air into an inside of the fuel cell system 10.

The air suction passage 31 is a passage through which the air whose foreign matter has been removed with the filter 30 passes to the compressor 32. The air suction passage 31 has one end coupled to the filter 30 and the other end coupled to a suction port of the compressor 32.

The compressor 32 is a cathode gas supply device that supplies the cathode gas to the fuel cell stack 1. In this embodiment, the compressor 32, which is the cathode gas supply device, takes the outside air (the cathode gas) in through the filter 30 to supply this cathode gas to the fuel cell stack 1 and the like. It should be noted that the cathode gas supply device may be a blower, a pump, and the like, insofar as a device configured to supply the cathode gas to the fuel cell stack 1. It should be noted that the compressor 32 is driven by receiving supply of the electric power from a light electrical battery 52 configured to store the electric power from the fuel cell stack 1.

The control valve 34 is a control valve that controls the flow rate of the cathode gas supplied to the fuel cell stack 1. The control valve 34 has an opening amount controlled by the control unit 6.

The heating device 35 is a device that heats the cathode gas supplied to the fuel cell stack 1. For example, the heating device 35 is constituted of a heat exchanger that exchanges the heat between the cathode gas and the discharged gas from the fuel cell stack 1, a combustor that heats the cathode gas by combusting the fuel, a combustor that heats the cathode gas using the heat of the catalytic reaction, and the like. The heating device 35 uses the fuel supplied from the fuel tank 20 via the branch passage 222 to heat the cathode gas.

A combustor air supply passage 331, which is a bypass passage that branches off from the cathode gas supply passage 33 to be coupled to the discharged air combustor 40, is constituted configured to bypass the fuel cell stack 1 to supply air to the discharged air combustor 40. It should be noted that the combustor air supply passage 331 is coupled to the discharged air combustor 40 in this embodiment. However, the combustor air supply passage 331 may join the cathode gas discharge passage 39.

A control valve 341 controls the flow rate of the cathode gas supplied to the discharged air combustor 40. The control valve 341 has an opening amount controlled by the control unit 6. Here, the discharged air combustor 40 mainly combusts uncombusted gas in the anode off-gas, and the oxygen contained in the cathode off-gas. However, the oxygen contained in the cathode off-gas supplied to the discharged air combustor 40 may get low during activation operation and electric generating operation of the fuel cell system 10. In such a case, since it is difficult to combust all the uncombusted gas, the control valve 341 is opened to supply the cathode gas as a combusting accelerating gas to the discharged air combustor 40. This can surely combust the uncombusted gas.

The discharged air system 4 includes the anode gas discharge passage 29, the cathode gas discharge passage 39, the discharged air combustor 40, and a discharged air passage 41.

A temperature sensor 62 is disposed on the anode gas discharge passage 29 positioned between the fuel cell stack 1 and the discharged air combustor 40. The temperature sensor 62 detects the temperature of the anode off-gas discharged from the fuel cell stack 1. The temperature sensor 62 has a detected value that is hereinafter referred to as an "anode outlet temperature." The anode outlet temperature detected at the temperature sensor 62 is output to the control unit 6.

The discharged air combustor 40 mixes the anode off-gas with the cathode off-gas to perform catalytic combusting on its mixed gas, thus generating the passage gas whose main constituents are carbon dioxide and water, and transmitting the heat by the catalytic combusting to the heat exchanger 25. The discharged air combustor 40 discharges a gas after combusting generated after combusting to the discharged air passage 41.

The discharged air passage 41 is a passage through which the gas after combusting is discharged from the discharged air combustor 40 to the outside air. The discharged air passage 41 passes through the evaporator 24 to be coupled to a muffler (not illustrated). Thus, the evaporator 24 will be heated with the gas after combusting from the discharged air combustor 40.

A temperature sensor 63 is disposed between the discharged air combustor 40 and the evaporator 24 on the discharged air passage 41. The temperature sensor 63 detects the temperature of the passage gas (the gas after combusting) discharged from the discharged air combustor 40. The temperature sensor 63 has a detected value that is hereinafter referred to as a "combustor outlet temperature." The combustor outlet temperature detected at the temperature sensor 63 is output to the control unit 6.

The electric power supply system 5 is disposed between the fuel cell stack 1 and the load device 90. The electric power supply system 5 boosts a voltage of the fuel cell stack 1 so as to cause the fuel cell stack 1 to supply a current, with respect to the voltage of the load device 90. This causes the fuel cell stack 1 to supply the electric power to the load device 90. The electric power supply system 5 corresponds to an electric power supply device. The electric power supply system 5 includes a voltage sensor 50, a DC-DC converter 51, a motor inverter (not illustrated), and the like.

The voltage sensor 50 is coupled to between a positive electrode terminal and a negative electrode terminal of the fuel cell stack 1 to detect the voltage at an output end of the fuel cell stack 1. The voltage sensor 50 has a detected value that is hereinafter referred to as a "stack voltage." The stack voltage detected at the voltage sensor 50 is output to the control unit 6.

The DC-DC converter 51 is an electric power controller that boosts the voltage of the fuel cell stack 1, for the voltages of a battery 92 and a drive motor 91, to take the generated power of the fuel cell stack 1 out to the battery 92 and the drive motor 91. The DC-DC converter 51 is coupled to the fuel cell stack 1 to boost the output voltage of the fuel cell stack 1 on a primary side, thus supplying the generated power to the load device 90 on a secondary side. The DC-DC converter 51, for example, increases the voltage of tens of V output from the fuel cell stack 1 to a voltage level of several hundreds of V so that the electric power is supplied to the load device 90.

The light electrical battery 52 is configured to store the generated power by the fuel cell stack 1. The light electrical battery 52 supplies driving electric power to the compressor 32. The light electrical battery 52 also supplies the electric power to the control valves 23, 231, 232, 34, 341, and the like that are solenoid valves. It should be noted that the control unit 6 controls execution or halt of charge from the fuel cell stack 1 to the light electrical battery 52.

The load device 90 is an electrical load coupled to the fuel cell system 10, and, for example, an electric component mounted on the vehicle. The load device 90 includes the drive motor 91 and the battery 92.

The drive motor 91 is coupled to each of the battery 92 and the DC-DC converter 51 via an inverter (not illustrated). The drive motor 91 is a power source that drives the vehicle. The drive motor 91 is configured to generate regenerative electric power using braking force required when braking the vehicle to charge the battery 92 with this regenerative electric power.

The battery 92 is an electric power supply source that supplies the stored electric power to the drive motor 91. In this embodiment, the battery 92 is a main electric power supply source, and the fuel cell stack 1 is mainly used to charge the battery 92 when an amount of charge in the battery 92 gets low. The electric power of the fuel cell stack 1 may be supplied to the drive motor 91 via the DC-DC converter 51.

The control unit 6 is constituted of a general-purpose electronic circuit including a microcomputer, a microprocessor, and a CPU, and peripheral devices. The control unit 6 executes a specific program to perform a process for controlling the fuel cell system 10.

The control unit 6 receives signals output from various sensors such as the voltage sensor 50 and the temperature sensors 61 to 63, and controls respective operating states of the fuel supply system 2, the oxidant supply system 3, the passage air system 4, and the electric power supply system 5 corresponding to these signals.

An operating unit 101 that outputs an activation instruction signal or a stop instruction signal of the fuel cell system 10 is coupled to the control unit 6. The operating unit 101 includes an EV key. When a vehicle occupant turns on the EV key, the operating unit 101 outputs the activation instruction signal to the control unit 6. When the vehicle occupant turns off the EV key, the operating unit 101 outputs the stop instruction signal to the control unit 6.

When the control unit 6 receives the activation instruction signal from the operating unit 101, the control unit 6 performs the activation operation that activates the fuel cell system 10. After an end of the activation operation, the control unit 6 performs the electric generating operation that controls the electric generation of the fuel cell stack 1 corresponding to an operating state of the load device 90. It should be noted that, when the amount of charge of the battery 92 becomes equal to or less than a predetermined value (for example, a State of Charge (SOC) becomes 90% or less) that requires the charge, the fuel cell system 10 may be activated.

In the electric generating operation, the control unit 6 obtains the electric power required for the fuel cell stack 1 corresponding to the operating state of the load device 90. Then, the control unit 6 calculates supply flow rates of the cathode gas and the anode gas required for the electric generation of the fuel cell stack 1 on the basis of this required electric power, and then, supplies the anode gas and the cathode gas having the calculated supply flow rates to the fuel cell stack 1. Then, the control unit 6 performs switching control on the DC-DC converter 51 to supply the electric power output from the fuel cell system 10 to the load device 90.

That is, the control unit 6 controls the flow rates of the cathode gas and the anode gas on the basis of the required electric power to the fuel cell stack 1 to control an amount of power generation of the fuel cell stack 1. For example, the required electric power to the fuel cell stack 1 increases as an accelerator pedal depression amount increases. In view of this, the larger the accelerator pedal depression amount is, the larger the supply flow rates of the cathode gas and the anode gas supplied to the fuel cell stack 1 are. It should be noted that the cathode gas supplied to the fuel cell stack 1 may be controlled on the basis of a deviation between a target temperature and an actual temperature of the fuel cell stack 1. When the actual temperature is higher than the target temperature, and when the deviation is large, a supply amount of the cathode gas is increased compared with a case when the deviation is small.

When the EV key is in the ON state, and in a system state where the electric power supply from the fuel cell system 10 to the load device 90 has been stopped, the control unit 6 reduces the electric generation of the fuel cell stack 1 and performs self-sustained operation that maintains the fuel cell at the state appropriate for the electric generation. In the following, the system state where the electric power supply from the fuel cell system 10 to the load device 90 has been stopped is referred to as an "idling stop (IS) state," and the self-sustained operation is referred to as an "IS operation."

When the required electric power to the fuel cell stack 1 has become a predetermined value, for example, zero, an operating state of the fuel cell system 10 transfers from the electric generating operation to the IS operation. Then, the control unit 6 controls the DC-DC converter 51 to stop the electric power supply from the fuel cell system 10 to the load device 90. During the IS operation, the generated power of the fuel cell stack 1 is sometimes supplied to an auxiliary machine disposed on the fuel cell system 10. It should be noted that the electric power supply from the fuel cell stack 1 need not been performed on the auxiliary machine.

When the control unit 6 receives the stop instruction signal from the operating unit 101, the control unit 6 performs a stop operation that stops operation of the fuel cell system 10.

FIG. 2 are views describing types of the electric power supply to the load device 90 in the fuel cell system 10 where the EV key is in the ON state.

Figure 2A:
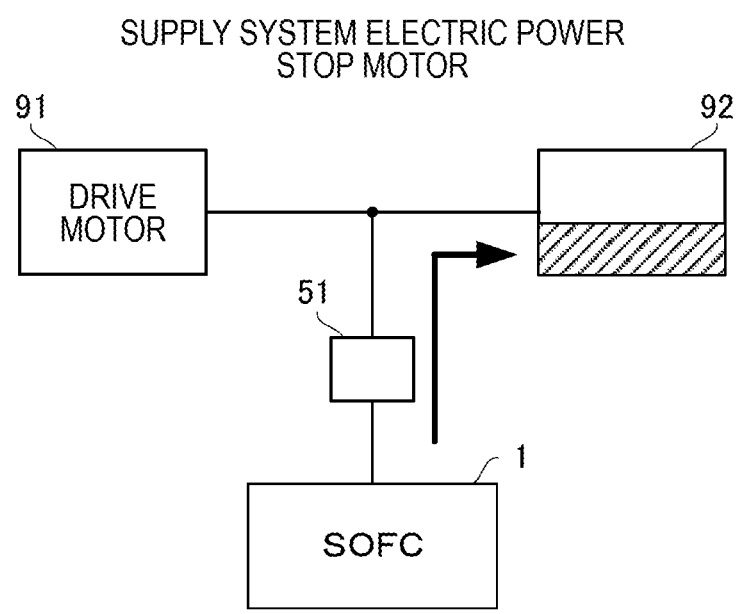
FIG. 2A is a schematic diagram illustrating an aspect of electric power supply by the fuel cell system.

FIG. 2A is a schematic diagram illustrating a state where the drive motor 91 is in a stopped state, and the electric power is supplied from the fuel cell system 10 to the battery 92. The state illustrated in FIG. 2A possibly occurs when the vehicle is in the stopped state, and the amount of charge of the battery 92 is little.

Figure 2B:
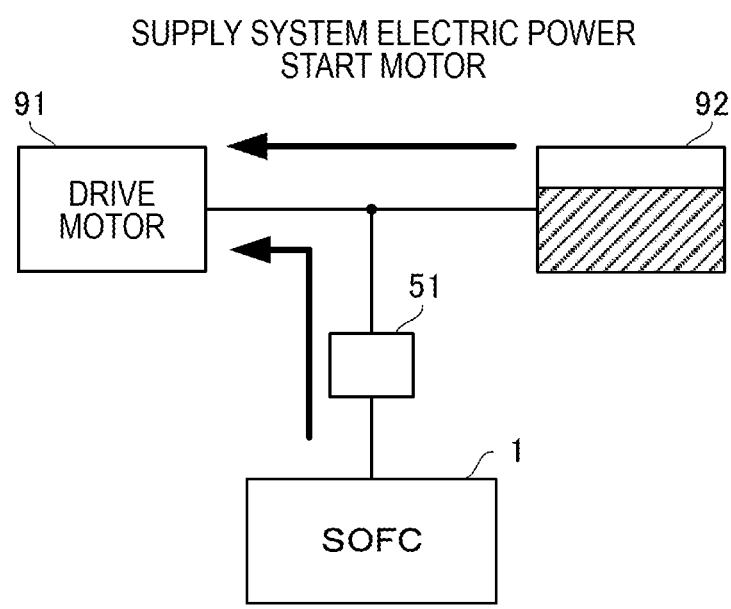
FIG. 2B is a schematic diagram illustrating an aspect of the electric power supply by the fuel cell system.

FIG. 2B is a schematic diagram illustrating a state where the drive motor 91 is in a power running state, and the electric power is supplied to the drive motor 91 from both of the fuel cell system 10 and the battery 92. The state illustrated in FIG. 2B possibly occurs when the vehicle is in an acceleration state, and the load (output) of the drive motor 91 is high.

Figure 2C:
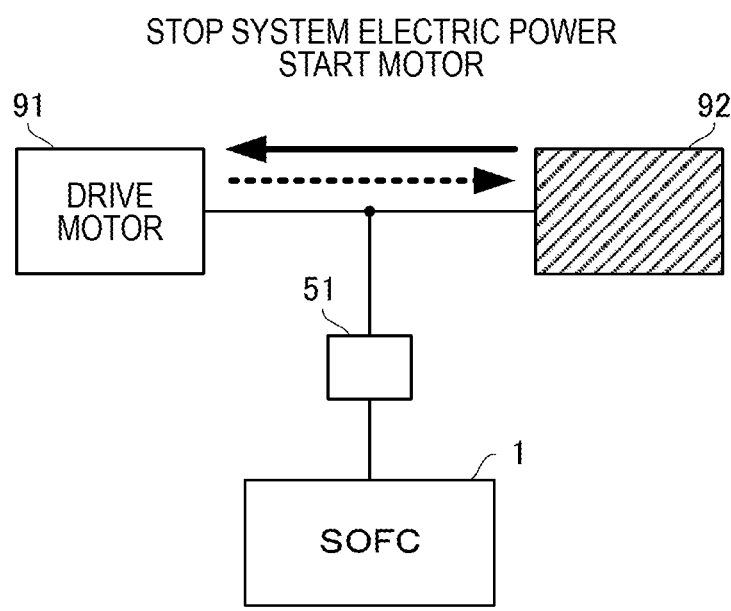
FIG. 2C is a schematic diagram illustrating an aspect of the electric power supply by the fuel cell system.

FIG. 2C is a schematic diagram illustrating a state where the drive motor 91 is in the power running state or a regeneration state, and the electric power supply from to the fuel cell system 10 to both of the drive motor 91 and the battery 92 has been stopped. The state illustrated in FIG. 2C possibly occurs in a state such that the drive motor 91 is driving at a low load or a middle load during running of the vehicle, and when the battery 92 has been fully charged. The state illustrated in FIG. 2C possibly occurs also when the vehicle is in a deceleration state, and when the battery 92 has a capacity that has room to be charged.

Figure 2D:
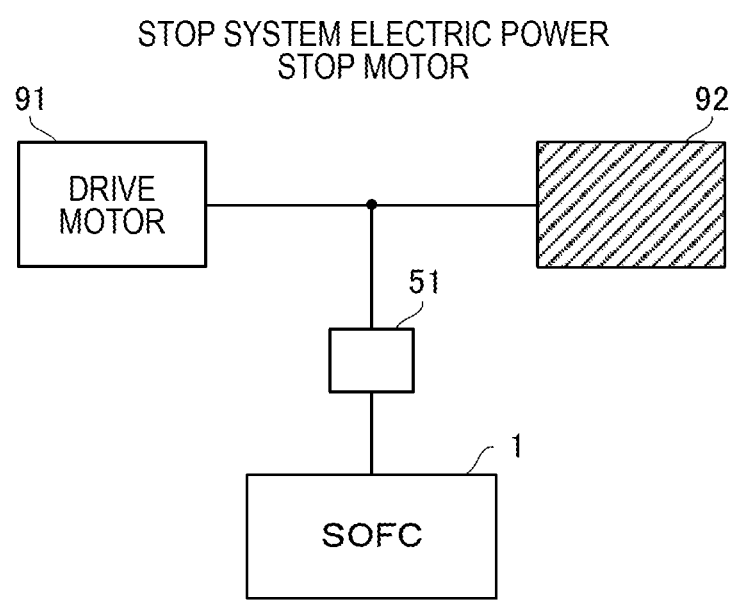
FIG. 2D is a schematic diagram illustrating an aspect of the electric power supply by the fuel cell system.

FIG. 2D is a schematic diagram illustrating a state where the drive motor 91 is in the stopped state, and the battery 92 has been fully charged. The state illustrated in FIG. 2D possibly occurs when the vehicle is in the stopped state, and the battery 92 has been fully charged.

Thus, among the states illustrated in FIG. 2A to FIG. 2D, the states illustrated in FIG. 2C and FIG. 2D, that is, the system state where the electric power supply from the fuel cell system 10 to both of the drive motor 91 and the battery 92 has been stopped corresponds to the IS state of the fuel cell system 10. When the IS state starts, the load device 90 transmits an IS operation request to the fuel cell system 10.

Accordingly, the fuel cell system 10 possibly becomes in the IS state, such as when the battery 92 has been fully charged by regeneration operation of the drive motor 91 during running of the vehicle, and when the battery 92 is in a state fully charged and the vehicle is running or has been stopped. In such a case, the required electric power to the fuel cell stack 1 becomes zero to perform the IS operation.

It is preferable that the supply of the anode gas to the fuel cell stack 1 has been stopped usually during the IS operation so as to reduce the unnecessary consumption of the fuel. However, when the supply of the anode gas to the fuel cell stack 1 is stopped, the cathode gas (air) transmits from the cathode electrode to the anode electrode in the fuel cell stack 1 as time passes. In such a condition, oxygen in the transmitted air oxidizes and degrades the anode electrode, thus deteriorating the electric generation performance of the fuel cell system 10.

As a measure for this, when the control unit 6 in this embodiment switches from the electric generating operation to the IS operation, the control unit 6 stops the electric power supply from the fuel cell system 10 to the load device 90 but continues the supply of the anode gas to the fuel cell stack 1.

The cathode gas that has transmitted through the electrolyte layer brings about chemical reaction (different from electrochemical reaction) directly with the anode gas, inside the fuel cell stack 1 during the IS operation. Therefore, after the IS operation is started, the stack voltage measured by the voltage sensor 50 decreases as time passes, in association with the decrease of the supply flow rate of the cathode gas. When the fuel cell stack 1 is exposed to oxygen in a high temperature state, Nickel, a catalyst of the fuel cell stack 1 degrades by the oxidation reaction.

As a measure for this, the control unit 6 in this embodiment continues the supply of the cathode gas to the fuel cell stack 1 so as to reduce the decrease of the voltage. In view of this, the decrease of the stack voltage is reduced. On the other hand, the supply of the anode gas is also continued to consume the oxygen transmitted to the anode electrode and maintain an anode gas concentration of the anode electrode at a high concentration. Thus, the oxidative degradation of the anode electrode can be reduced.

The following concretely describes the operation of the fuel cell system 10 in this embodiment.

Figure 3A:
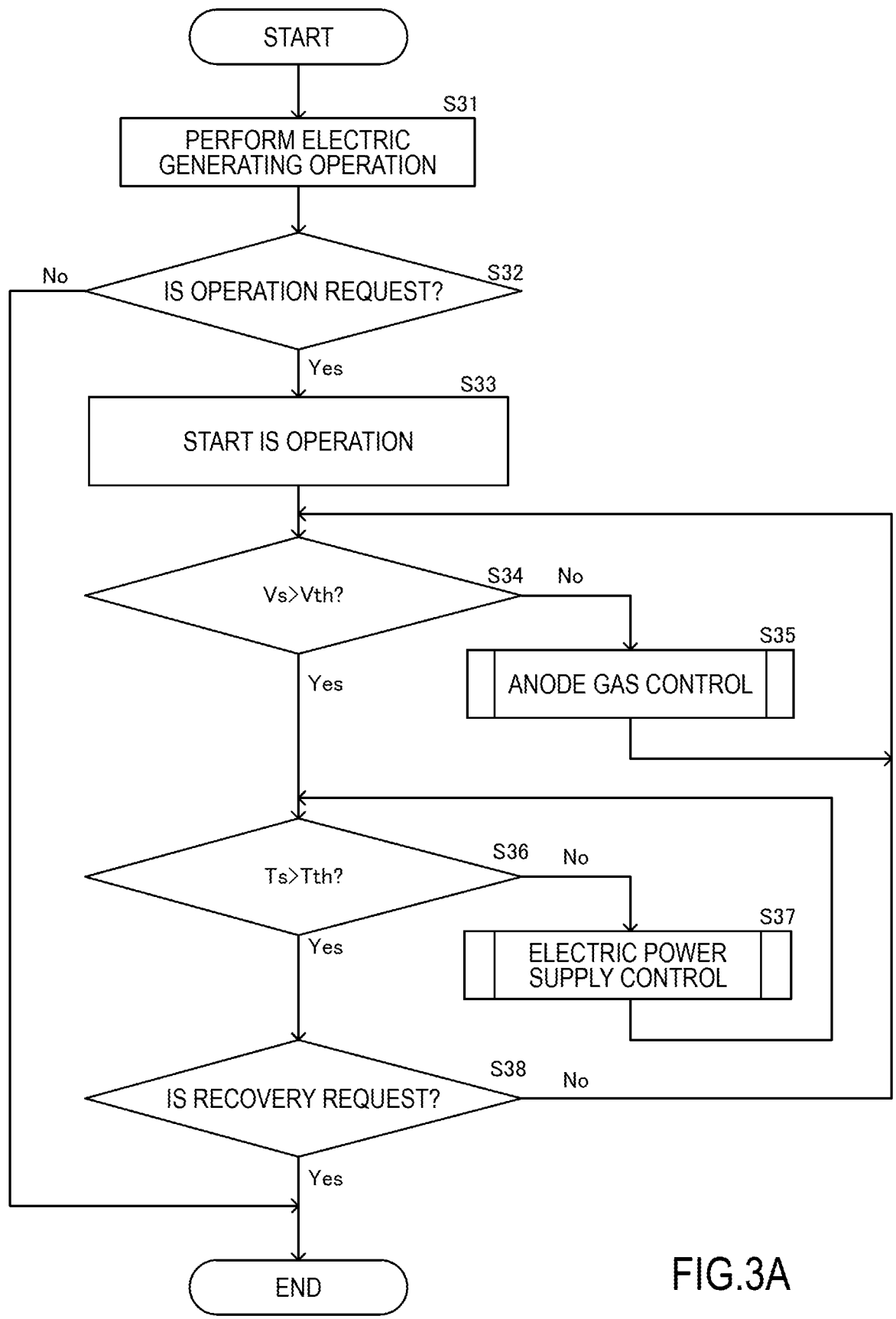
FIG. 3A is a flowchart illustrating operation control of the fuel cell system.

FIG. 3A is a flowchart illustrating operation control of the fuel cell system 10 in this embodiment.

In Step S31, the control unit 6 performs the electric generating operation. When the electric generating operation is performed, the control unit 6 controls the electric power controller on the basis of the required electric power to the fuel cell stack 1 and adjusts an electric energy taken out from the fuel cell stack 1.

Meanwhile, the control unit 6 calculates target values of a cathode gas flow rate and an anode gas flow rate that are required for the electric generation of the fuel cell stack 1, using, for example, preliminarily determined map and operation expression, on the basis of the required electric power from the load device 90 to the fuel cell system 10.

Then, the control unit 6 drives the compressor 32 on the basis of the target value of the cathode gas flow rate and opens the control valve 34. When the compressor 32 supplies the cathode gas from an outside of the fuel cell system 10, the temperature of this cathode gas is increased by the heating device 35, and then, this cathode gas is supplied to the cathode electrode of the fuel cell stack 1.

Simultaneously, the control unit 6 drives the pump 21 on the basis of the target value of the anode gas flow rate and opens the control valve 23. The fuel for reforming supplied from the fuel tank 20 by the pump 21 is evaporated by the evaporator 24, and the evaporated fuel is heated by the heat exchanger 25. The heated fuel is reformed to the anode gas in the reformer 26, and this anode gas is supplied to the anode electrode of the fuel cell stack 1.

Then, in the fuel cell stack 1, the anode gas and the cathode gas that have been supplied corresponding to a conductive state of the electric power controller cause the electrochemical reaction, and this generates the electric power. The anode off-gas and the cathode off-gas that are generated after the electrochemical reaction are discharged from the fuel cell stack 1 to the discharged air combustor 40.

In Step S32, the control unit 6 determines whether the control unit 6 has received the IS operation request from the load device 90 or not. The IS operation request is issued when the required electric power to the fuel cell stack 1 has become zero, for example, when the battery 92 has been fully charged, and when the amount of charge of the battery 92 has become equal to or less than a predetermined value that requires charging.

When the control unit 6 does not receive the IS operation request (S32: No), the control unit 6 ends the operation control of the fuel cell system 10. Therefore, the electric generating operation will be performed. When the control unit 6 receives the IS operation request (S32: Yes), the control unit 6 proceeds to a process in S33 to perform the IS operation.

In Step S33, the IS operation is started. The control unit 6 controls the operation of the DC-DC converter 51 to stop the electric power supply from the fuel cell system 10 to the load device 90. Then, the control unit 6 controls the control valve 34 and the control valve 23 to decrease their opening amounts, thus controlling the flow rates of the anode gas and the cathode gas. Thus, the anode gas and the cathode gas having predetermined flow rates will be supplied to the fuel cell stack 1.

Here, the predetermined flow rate of the anode gas supplied to the fuel cell stack 1 is determined to an amount that the anode electrode does not oxidize and degrade even if the cathode gas transmits from the cathode electrode to the anode electrode in the fuel cell stack 1. For example, an assumed duration of the IS operation is preliminarily determined, and a predetermined flow rate that the anode gas concentration can be maintained at the high concentration even if oxygen flows in the anode electrode during this duration is set. The control unit 6 may temporarily increase the anode gas supply flow rate to the fuel cell stack 1 every predetermined duration.

The predetermined flow rate of the cathode gas is determined so as to maintain an electric potential of the cathode electrode of the fuel cell stack 1. Therefore, in the fuel cell stack 1, the voltage does not decrease caused by shortage of the cathode gas.

It should be noted that such a predetermined flow rate of the anode gas and such a predetermined flow rate of the cathode gas may be obtained by experiment, or may be obtained on the basis of a calculation result such as simulation.

In Step S33, the control unit 6 controls the control valve 341 to start the supply of the cathode gas to the discharged air combustor 40. Thus, the uncombusted gas contained in the anode off-gas in the discharged air combustor 40 can be surely combusted.

In Step S34, the control unit 6 determines whether a stack voltage Vs exceeds a predetermined threshold voltage Vth or not. When the stack voltage Vs is equal to or less than the threshold voltage Vth (S34: No), the control unit 6 determines that it is necessary to control the stack voltage Vs to be an appropriate voltage value, thus proceeding to a process in S35. When the stack voltage Vs exceeds the threshold voltage Vth (S34: Yes), the control unit 6 proceeds to a process in S36.

Here, the stack voltage Vs changes corresponding to a degree of progress of the direct chemical reaction between the anode gas and the cathode gas inside the fuel cell stack 1. Sufficient cathode gas is supplied to the fuel cell stack 1 so that the voltage does not decrease caused by the shortage of the cathode gas. Therefore, the stack voltage Vs decreases only by reduction of the anode gas inside the fuel cell stack 1. Here, when the stack voltage Vs significantly decreases, since the anode gas concentration decreases and an oxygen partial pressure increases, a possibility that the anode electrode of the fuel cell stack 1 oxidizes is high. Therefore, in a determination process in S34, the stack voltage Vs such that the possibility that the anode electrode oxidizes inside the fuel cell stack 1 is high is set as the threshold voltage Vth. Then, in S35, control is performed such that the stack voltage Vs does not fall below the threshold voltage Vth by adjusting the supply flow rate of the anode gas, thus ensuring maintenance of the stack voltage Vs during the IS operation.

In Step S35, the anode gas control process as described above is performed. The detail of this anode gas control process is illustrated in FIG. 3B.

Figure 3B:
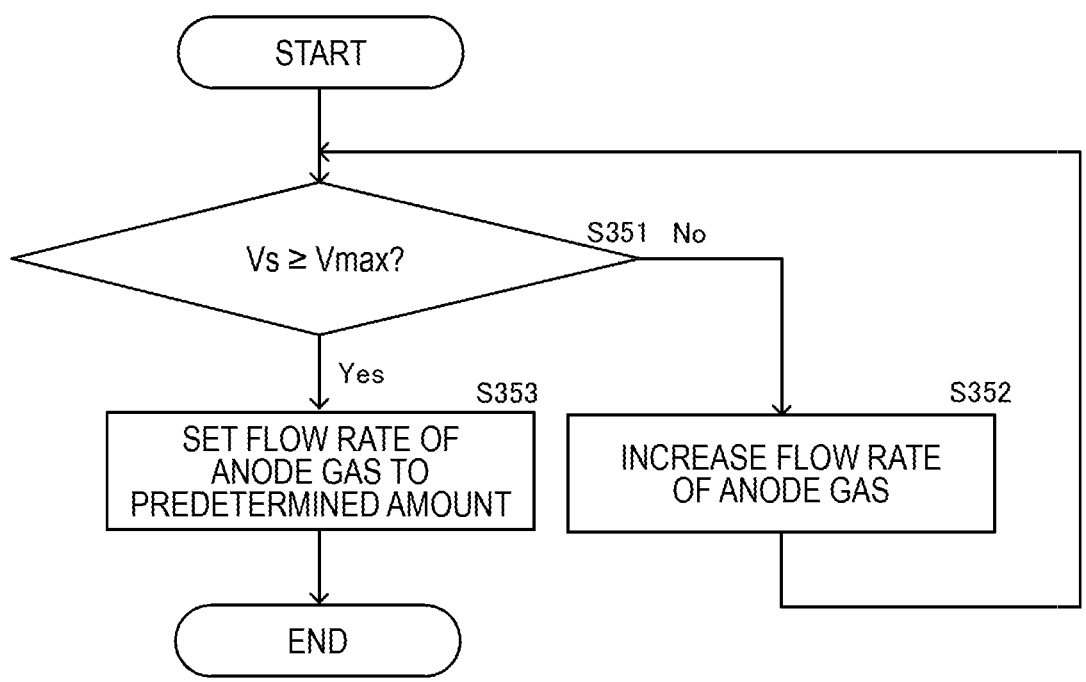
FIG. 3B is a flowchart illustrating anode gas control.

Referring to FIG. 3B, first, in Step S351, the control unit 6 determines whether the stack voltage Vs is equal to or more than an upper limit voltage Vmax or not. Here, the upper limit voltage Vmax is, for example, an upper limit value of the stack voltage Vs acceptable during the IS operation.

When the stack voltage Vs is equal to or more than the upper limit voltage Vmax (S351: Yes), the control unit 6 determines that it is not necessary to increase the stack voltage Vs, thus proceeding to a process in S353. When the stack voltage Vs falls below the upper limit voltage Vmax (S351: No), the control unit 6 determines that it is necessary to increase the stack voltage Vs, thus proceeding to Step S352.

In Step S352, the control unit 6 increases the opening amount of the control valve 23 to increase the flow rate of the anode gas that flows into the fuel cell stack 1. After the process in S352, the control unit 6 returns to the process in Step S351.

Here, as described above, the cathode gas with a predetermined amount so that the voltage does not decrease caused by the shortage of the cathode gas is supplied to the fuel cell stack 1. Therefore, the decrease of the stack voltage Vs will be caused by the shortage of the anode gas. Accordingly, the stack voltage Vs can be increased by increasing the flow rate of the anode gas.

The increase of the flow rate of the anode gas rapidly increases the stack voltage Vs. Therefore, the control unit 6 preliminarily determines the flow rate to increase the anode gas, and a period to increase the anode gas, and controls the control valve 23 so that the stack voltage Vs becomes the upper limit voltage Vmax, thus increasing the flow rate of the anode gas. It should be noted that the supply flow rate and the period to increase the anode gas may be obtained by experiment, or may be obtained on the basis of a calculation result such as simulation.

In Step S353, the control unit 6 decreases the opening amount of the control valve 23 to reduce the flow rate of the anode gas to a predetermined flow rate. Thus performing the anode gas control process allows controller 6 to maintain the stack voltage Vs during the IS operation in a desired voltage range and reduce the oxidation of the anode electrode.

Referring to FIG. 3A again, in Step S36, the control unit 6 determines whether a stack temperature Ts that is a temperature of the fuel cell stack 1 exceeds a threshold temperature Tth (for example, 650 degrees) or not. Here, the threshold temperature Tth is a temperature where a conductivity of an oxygen ion is ensured in the electrolyte layer of the fuel cell stack 1. Therefore, it is necessary that the stack temperature Ts is above the threshold temperature Tth so that the fuel cell stack 1 resumes the electric generation without delay. When the stack temperature Ts is equal to or less than the threshold temperature Tth (S36: No), the control unit 6 determines that it is necessary to increase the stack temperature Ts, thus proceeding to a process in S37. When the stack temperature Ts exceeds the predetermined threshold temperature Tth (S36: Yes), the control unit 6 proceeds to a process in S38. It should be noted that the stack temperature Ts can be obtained from a stack inlet temperature obtained from the temperature sensor 61, and a stack outlet temperature obtained from the temperature sensor 62.

In Step S37, an electric power supply control is performed. The detail of this electric power supply control is illustrated in FIG. 3C.

Figure 3C:
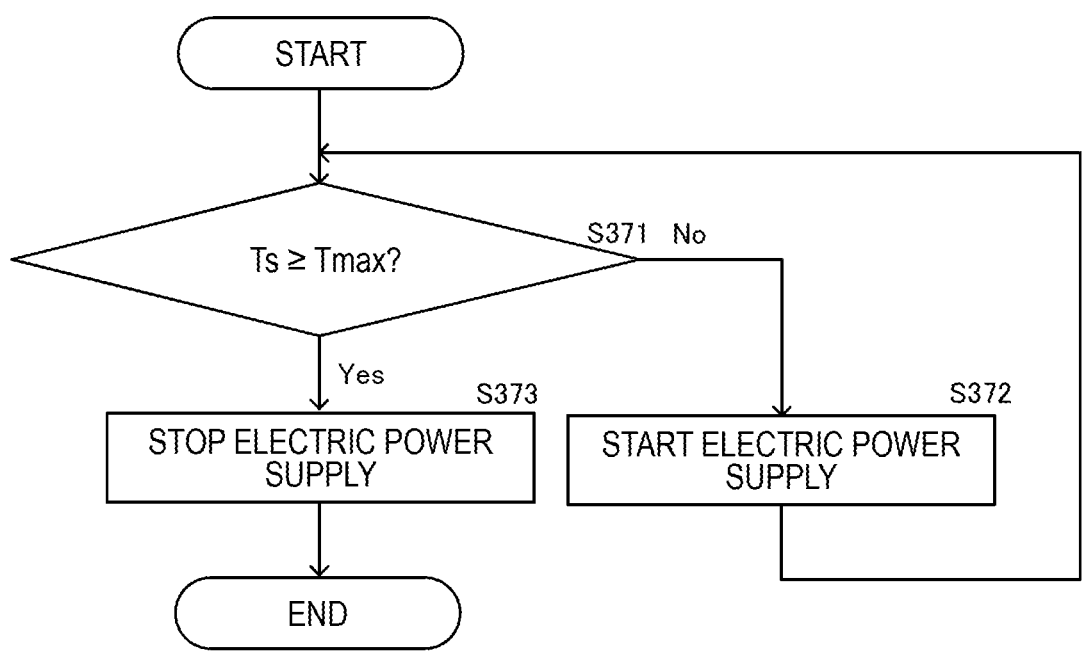
FIG. 3C is a flowchart illustrating electric power supply control.

Referring to FIG. 3C, first, in Step S371, the control unit 6 determines whether the stack temperature Ts is equal to or more than an upper limit temperature Tmax (for example, 750 degrees) acceptable during the IS operation or not. When the stack temperature Ts is equal to or more than the upper limit temperature Tmax (S371: Yes), the control unit 6 determines that it is not necessary to increase the stack temperature Ts, thus proceeding to a process in S373. When the stack temperature Ts falls below the upper limit temperature Tmax (S371: No), the control unit 6 determines that it is necessary to increase the stack temperature Ts, thus proceeding to Step S372.

In Step S372, the control unit 6 causes the fuel cell stack 1 to start the electric power supply to the auxiliary machine included in the fuel cell system 10. For example, the control unit 6 may increase the electric power supplied to the compressor 32 via the light electrical battery 52. Thus, the fuel cell stack 1 starts the electric generation to increase the stack temperature Ts.

The supply flow rate of the cathode gas to the fuel cell stack 1 while the fuel cell stack 1 is supplying the electric power to the auxiliary machine during the IS operation is less than the supply flow rate of the cathode gas to the fuel cell stack 1 during the electric generating operation. Since the temperature of the cathode gas supplied to the fuel cell stack 1 is lower than the temperature of the fuel cell stack 1 that is performing the electric generation, the larger the supply flow rate of the cathode gas is, the lower the temperature of the fuel cell stack 1 is. Therefore, the decrease of the temperature of the fuel cell stack 1 can be reduced by reducing the cathode gas supplied to the fuel cell stack 1 compared with that during the electric generating operation.

After the process in S372 is performed, the control unit 6 returns to the process in Step S371. Therefore, this increase of supply electric power is performed until when the stack temperature Ts becomes equal to or more than the upper limit temperature Tmax.

In Step S373, the control unit 6 causes the fuel cell stack 1 to stop the electric power supply. For example, the control unit 6 cuts off the electric power supply from the fuel cell system 10 to the light electrical battery 52. Thus, the control unit 6 stops the increase of the stack temperature Ts. Therefore, the stack temperature Ts constantly becomes a temperature appropriate for the electric generation, thus ensuring the conductivity of the oxygen ion in the electrolyte layer.

Referring to FIG. 3A again, in Step S38, the control unit 6 determines whether the control unit 6 has accepted an IS recovery request from the load device 90 or not. The IS recovery request is issued, for example, when the charge is required for the battery 92, and when there is a possibility that the electric power supply to the drive motor 91 gets low. That is, the IS recovery request is issued when the load (the required electric power) of the load device 90 becomes larger than zero.

The control unit 6 returns to Step S34 when the control unit 6 does not accept the IS recovery request (S38: No), and repeatedly performs the processes from Step S34 to S37 until when the control unit 6 receives the IS recovery request from the load device 90. On the other hand, the control unit 6 ends the IS operation to end the operation control when the control unit 6 accepts the IS recovery request (S38: Yes). This transitions the operating state of the fuel cell system 10 from the IS operation to the electric generating operation. In a next control cycle, the electric generating operation is performed in Step S31. As described above, the stack temperature Ts constantly becomes the temperature appropriate for the electric generation, thus ensuring the conductivity of the oxygen ion in the electrolyte layer. Accordingly, a period needed for the transition from the IS operating state to the electric generation operating state can be shortened.

Thus, when the control unit 6 performs the IS operation, the control unit 6 continuously supplies the anode gas and the cathode gas to the fuel cell stack 1 after stopping the electric power supply from the fuel cell system 10 to the load device 90. Then, the stack voltage Vs and the stack temperature Ts will be maintained at values in appropriate ranges.

Figure 4:
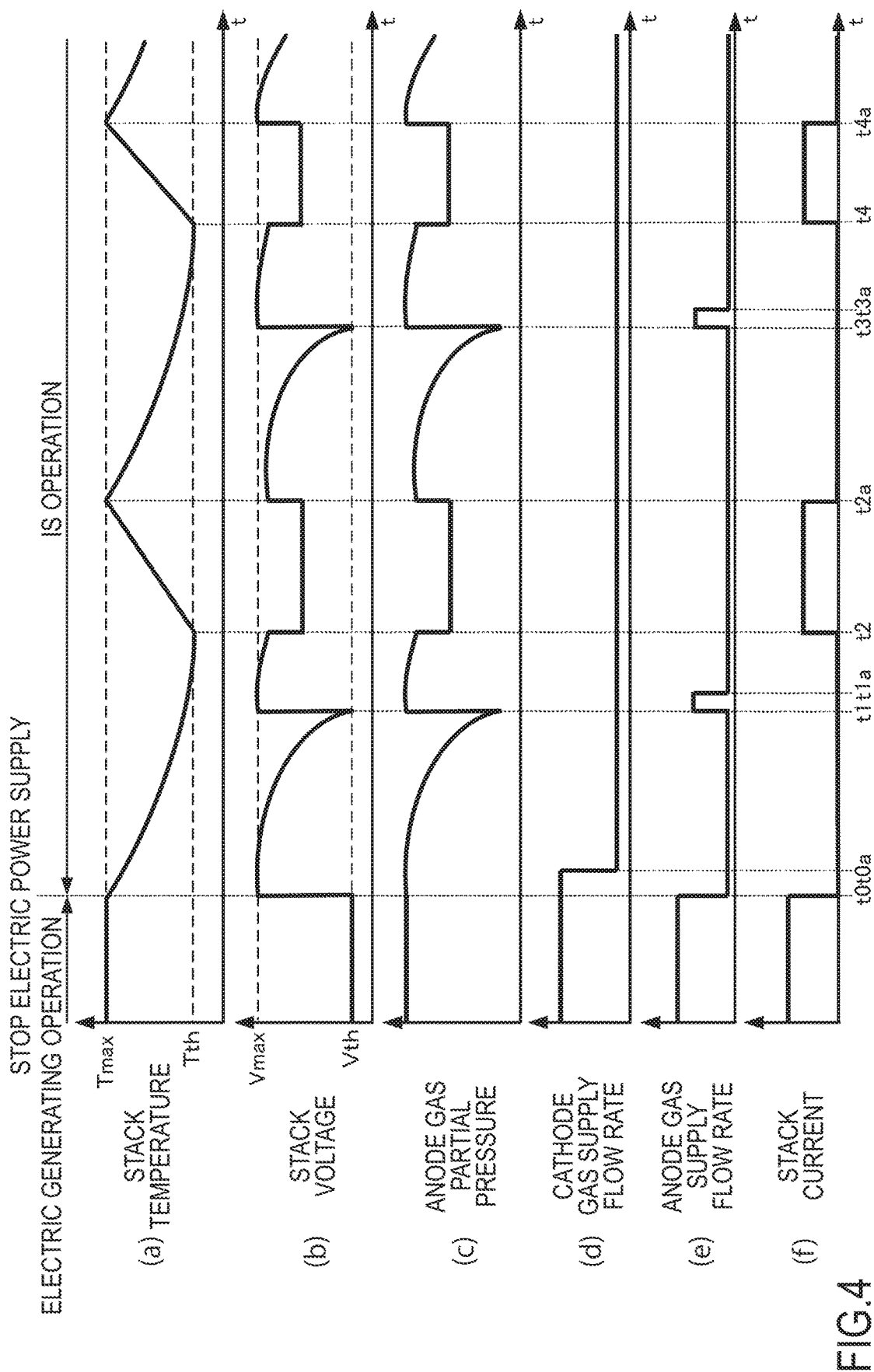
FIG. 4 is a view illustrating time series variation in the fuel cell system.

FIG. 4 is a timing chart illustrating a control method for the IS operation according to the embodiment.

FIG. 4(a) is a view illustrating a change in the stack temperature Ts. FIG. 4(b) is a view illustrating a change in the stack voltage Vs. FIG. 4(c) is a view illustrating an anode gas partial pressure inside the fuel cell stack 1. FIG. 4(d) is a view illustrating a change in the flow rate of the cathode gas supplied to the fuel cell stack 1, corresponding to the opening amount of the control valve 34. FIG. 4(e) is a view illustrating a change in the flow rate of the anode gas supplied to the fuel cell stack 1, corresponding to the opening amount of the control valve 23. FIG. 4(f) is a view illustrating a change in the current supplied from the fuel cell stack 1. The respective views from FIG. 4(a) to FIG. 4(f) have horizontal axis that are common time axes.

A time t0 is a time when, for example, the battery 92 has been fully charged, and the IS operation request is issued from the load device 90. The electric generating operation (S31) is performed before the time t0. Then, at the time t0, when the IS operation request is accepted from the load device 90 (S32: Yes), the electric power supply from the fuel cell system 10 to the load device 90 is stopped. Then, the IS operation (S33 to S38) will be performed after the time t0.

At the time t0, when the IS operation is started, the control unit 6 controls the DC-DC converter 51 to cause the fuel cell system 10 to stop the supply of the current to the load device 90 as illustrated in FIG. 4(f). Simultaneously, as illustrated in FIG. 4(e), the control unit 6 decreases the opening amount of the control valve 23 to supply the anode gas only with a predetermined flow rate to the fuel cell stack 1.

Then, at a time t0a delayed for a predetermined period from the time t0, the control unit 6 decreases the opening amount of the control valve 34 to supply the cathode gas only with a predetermined flow rate to the fuel cell stack 1. Here, even after closing the control valve 23 at the time t0, all of the fuel and the anode gas that exist between the control valve 23 on the anode gas supply passage 22 and the fuel cell stack 1 are not immediately consumed. Therefore, it is necessary to continue the supply of the cathode gas to the fuel cell stack 1 in order to consume all of these fuel and anode gas in the fuel cell stack 1. Accordingly, a timing (the time t0a) when the cathode-gas supply flow rate decreases is got behind a timing (the time t0) when the anode-gas supply flow rate decreases.

As illustrated in FIG. 4(c), the direct chemical reaction between the anode gas and the cathode gas that exist inside the fuel cell stack 1 progresses to reduce the anode gas partial pressure between the time t0 and a time t1. Therefore, as illustrated in FIG. 4(b), the stack voltage Vs also decreases. As illustrated in FIG. 4(a), between the time t0 and a time t2, the electric generation is not performed in the fuel cell stack 1, thus decreasing the stack temperature Ts.

At the time t1, as illustrated in FIG. 4(b), the stack voltage Vs becomes the threshold voltage Vth. Here, referring to FIG. 3A, when the stack voltage Vs becomes equal to or less than the threshold voltage Vth (S34: No), the control unit 6 performs the anode gas supply control (S35). As illustrated in FIG. 3B, in the anode gas supply control, the control unit 6 controls the control valve 23 to increase the supply flow rate of the anode gas to the fuel cell stack 1 only for a predetermined period (S352). Then, as illustrated in FIG. 4(c), in association with the increase of the anode gas partial pressure inside the fuel cell stack 1, the stack voltage Vs increases as illustrated in FIG. 4(b).

Then, at a time t1a, after the anode gas is supplied for the predetermined period, the stack voltage Vs reaches the upper limit voltage Vmax (S351: Yes). Then, the control unit 6 controls the control valve 23 to reduce the flow rate of the anode gas to the fuel cell stack 1, thus supplying the anode gas only with the predetermined flow rate (S353).

It should be noted that, between the time t1 and the time t2, while the stack voltage Vs increases, the electric power supply from the fuel cell system 10 to the load device 90 has been stopped. Accordingly, the electric generation is not performed in the fuel cell stack 1. Therefore, as illustrated in FIG. 4(a), the stack temperature Ts continues to decrease.

At the time t2, as illustrated in FIG. 4(a), the stack temperature Ts becomes the threshold temperature Tth. Here, referring to FIG. 3A, when the stack temperature Ts becomes equal to or less than the threshold temperature Tth (S36: No), the control unit 6 performs the electric power supply control (S37). As illustrated in FIG. 3C, in the electric power supply control, the control unit 6 starts the electric power supply from the fuel cell stack 1 (S372) to cause the fuel cell stack 1 to perform the electric generation to generate heat. Therefore, as illustrated in FIG. 4(a), after the time t2, the fuel cell stack 1 resumes the electric generation to start the increase of the stack temperature Ts. As illustrated in FIG. 4(f), a stack current supplied to, for example, the auxiliary machine of the fuel cell system 10 from the fuel cell stack 1 increases.

Then, at a time t2a, when the stack temperature Ts reaches the upper limit temperature Tmax (S371: No), the electric power supply from the fuel cell stack 1 is stopped (S373) as illustrated in FIG. 4(f). Accordingly, as illustrated in FIG. 4(a), the electric generation of the fuel cell stack 1 is stopped, thus stopping the increase of the temperature of the stack temperature Ts.

Here, referring to FIGS. 4(b) and 4(c), between the time t2 and the time t2a, the electric generation is performed in the fuel cell stack 1, thus temporarily decreasing the stack voltage Vs and the anode gas partial pressure. At the time t2a, when the electric generation of the fuel cell stack 1 is stopped, the stack voltage Vs and the anode gas partial pressure increase again.

At times t3, t3a, t4, and t4a, the processes similar to the time t1, t1a, t2, and t2a are performed inside the fuel cell system 10 respectively.

It should be noted that this embodiment has described an example that the load device 90 issues the IS operation request to the fuel cell system 10 when the battery 92 has been fully charged and the load (the required electric power) of the load device 90 has become zero. However, the present invention is not limited to this. The load device 90 may issue the IS operation request to the fuel cell system 10 when the amount of charge of the battery 92 is equal to or less than a predetermined remaining amount (for example, 90%) that requires charging.

With the fuel cell system 10 in the first embodiment, the following effect can be obtained.

With the fuel cell system 10 in the first embodiment, the fuel cell system 10 that is performing an electric generating operation step (S31) performs a self-sustained operation step (S33 to S37) when receiving the IS operation request after the load (the required electric power) has become equal to or less than a predetermined value (S32: Yes). In the self-sustained operation step, the anode gas with a predetermined flow rate and the cathode gas with a predetermined flow rate are supplied to the fuel cell stack 1 (S33).

Here, the anode electrode of the fuel cell stack 1 easily oxidizes on contact with oxygen. Therefore, when the cathode gas transmits to the anode electrode inside the fuel cell stack 1, the anode electrode possibly degrades. Therefore, while the self-sustained operation is performed, the anode gas with a predetermined amount is supplied to the fuel cell stack 1. Thus, even if the cathode gas transmits to the anode electrode, oxygen contained in the transmitted cathode gas is consumed by the direct chemical reaction with the anode gas. Thus, the anode gas concentration is maintained at the high concentration in the anode electrode to decrease the oxygen partial pressure, thus ensuring prevention of the oxidative degradation of the anode electrode.

Even when the electric power supply from the fuel cell stack 1 to the load device 90 is not performed, if the anode gas and the cathode gas are supplied to the fuel cell stack 1, the direct chemical reaction between the anode gas and the cathode gas progresses in the fuel cell stack 1. This can reduce the decrease of the stack voltage during the self-sustained operation.

With the fuel cell system 10 in the first embodiment, the cathode gas with a flow rate that can maintain the electric potential of the cathode electrode of the fuel cell stack 1 is supplied. Thus, the electric potential of the cathode electrode is maintained to reduce the decrease of the voltage caused by the shortage of the cathode gas. Therefore, controlling only the anode gas can control the voltage of the fuel cell stack 1.

With the fuel cell system 10 in the first embodiment, while the self-sustained operation is performed, the anode gas with a predetermined flow rate that can consume the oxygen contained in the cathode gas that transmits to the anode electrode is supplied to the fuel cell stack 1. Therefore, the oxidative degradation of the anode electrode can be reduced without consuming the anode gas more than necessary.

Furthermore, the cathode gas with a predetermined flow rate that does not generate the decrease of the voltage caused by the shortage of the cathode gas is supplied to the fuel cell stack 1. Reducing the decrease of the voltage caused by the shortage of the cathode gas can control the voltage of the fuel cell stack 1 by controlling only the anode gas. Accordingly, controllability of the fuel cell system 10 improves.

With the fuel cell system 10 in the first embodiment, a voltage maintenance step (S34 and S35) that changes the supply flow rate of the anode gas to the fuel cell stack 1 corresponding to the stack voltage Vs is performed. Here, when the stack voltage Vs decreases, since the oxygen partial pressure increases in accordance with the decrease of the anode gas concentration, an anode electrode of the fuel cell stack 1 easily oxidizes. Therefore, the oxidative degradation of the anode electrode can be reduced such that the voltage maintenance step (S34 and S35) that maintains the stack voltage Vs in a predetermined voltage range is performed.

With the fuel cell system 10 in the first embodiment, when the stack voltage Vs falls below the threshold voltage Vth (S34: No), the supply flow rate of the anode gas to the fuel cell stack 1 is increased so that the stack voltage Vs becomes the upper limit voltage Vmax (S352). Then, when the stack voltage Vs becomes the upper limit voltage Vmax (S351: Yes), the supply flow rate of the anode gas to the fuel cell stack 1 is reduced (S353). Thus, the stack voltage Vs can be maintained in a voltage range of the threshold voltage Vth and the upper limit voltage Vmax.

With the fuel cell system 10 in the first embodiment, a temperature maintenance step (S36 and S37) where the temperature (the stack temperature) of the fuel cell stack 1 becomes in a predetermined temperature range is performed. Thus, since the conductivity of the oxygen ion in the electrolyte layer is ensured to cause the fuel cell stack 1 to have a temperature that can constantly and appropriately perform the electric generation, the fuel cell stack 1 can immediately resume the electric generation. Accordingly, delay in transition from the self-sustained operating state to the electric generation operating state can be reduced.

With the fuel cell system 10 in the first embodiment, an electric power supply step (S37) that performs the electric power supply from the fuel cell system 10 to the load device 90 is performed in the temperature maintenance step. When the stack temperature Ts falls below the threshold temperature Tth (S36: No), the electric power supply of the fuel cell stack 1 is started (S372). Then, when the stack temperature Ts becomes the upper limit temperature Tmax (S371: Yes), the electric power supply is stopped (S373). Thus, the stack temperature Ts is maintained to ensure the shortening of the period needed to transition from the self-sustained operating state to the electric generation operating state.

With the fuel cell system 10 in the first embodiment, when the electric power supply step (S37) is performed, the electric power is supplied from the fuel cell stack 1 to the auxiliary machine of the fuel cell system 10 such as a cathode compressor 9. Thus, the fuel cell stack 1 can perform the electric power supply on other than the electric power supply system 5 without adding a new auxiliary machine, thus simplifying the configuration of the fuel cell system 10.

With the fuel cell system 10 in the first embodiment, the supply flow rate of the cathode gas to the fuel cell stack 1 when the electric power supply step (S37) is performed is less than the supply flow rate of the cathode gas to the fuel cell stack 1 during the electric generating operation. Thus, inflow of the cathode gas at a relatively low temperature to the fuel cell stack 1 can be reduced, thus ensuring prevention of the reduction of the temperature of the fuel cell stack 1.

With the fuel cell system 10 in the first embodiment, the discharged air combustor 40 mixes the anode off-gas and the cathode off-gas that are discharged from the fuel cell stack 1 to combust its mix gas. Thus, the uncombusted gas contained in the anode off-gas is completely combusted, thus ensuring prevention of discharge of the anode gas contained in the uncombusted gas to the outside of the fuel cell system 10.

Second Embodiment

Figure 5A:
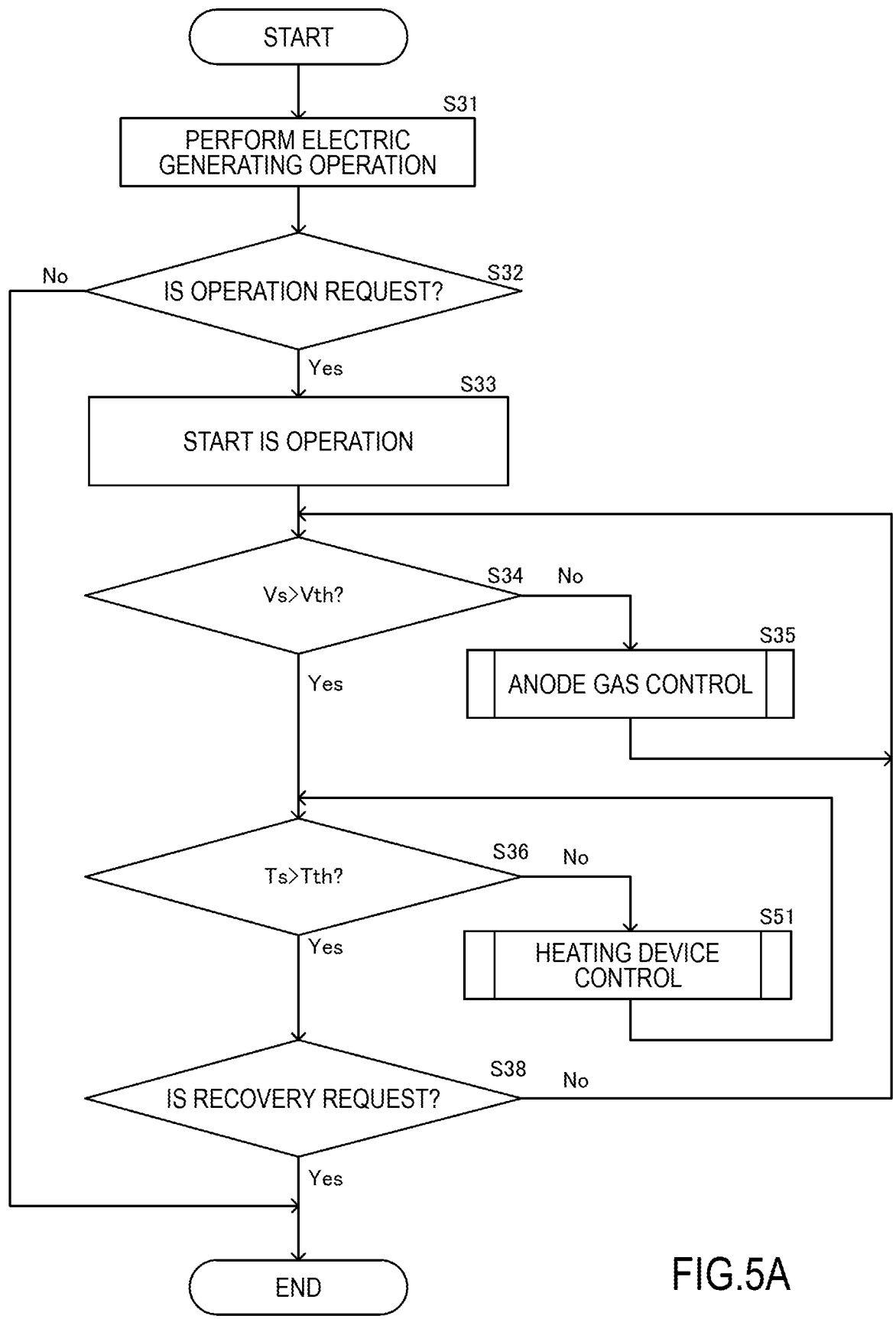
FIG. 5A is a flowchart illustrating operation control of a fuel cell system in a second embodiment.

FIG. 5A is a flowchart illustrating an exemplary procedure regarding operation control of a fuel cell system 10 in a second embodiment of the present invention.

In the operation control of the fuel cell system 10 illustrated in FIG. 5A, compared with the operation control of the fuel cell system 10 in the first embodiment illustrated in FIG. 3A, a difference is that the process in Step S37 is changed to a process in Step S51.

In Step S51, a heating device control is performed. The detail of this heating device control is illustrated in FIG. 5B.

Figure 5B:
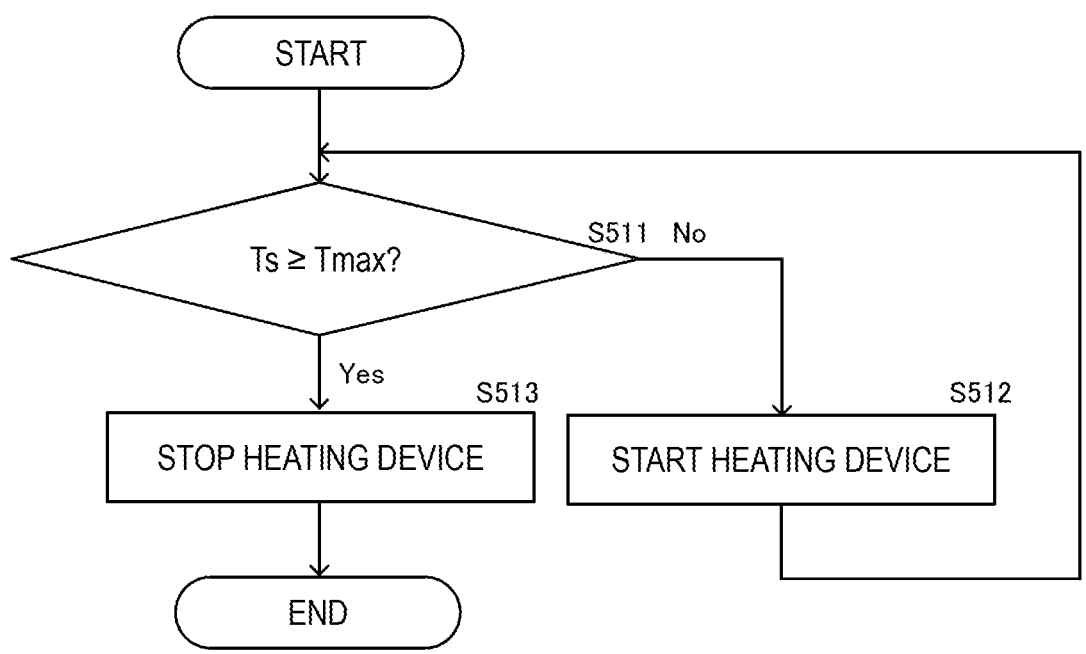
FIG. 5B is a flowchart illustrating heating device control.

Referring to FIG. 5B, first, in Step S511, the control unit 6 determines whether the stack temperature Ts is equal to or more than the upper limit temperature Tmax or not. When the stack temperature Ts is equal to or more than the upper limit temperature Tmax (S511: Yes), the control unit 6 determines that it is not necessary to increase the stack temperature Ts, thus proceeding to a process in S513. When the stack temperature Ts falls below the upper limit temperature Tmax (S511: No), the control unit 6 determines that it is necessary to increase the stack temperature Ts, thus proceeding to Step S512.

In Step S512, the control unit 6 activates the heating device 35 and controls the control valve 232 to increase the supply flow rate of the fuel to the heating device 35. Thus, since a heat generation amount of the heating device 35 increases, the cathode gas that passes through the cathode gas supply passage 33 via the compressor 32 is further heated by the heating device 35, and then supplied to the fuel cell stack 1. As a result, the stack temperature Ts increases.

After the process in S512 is performed, the control unit 6 returns to the process in Step S511. Therefore, this driving of the heating device 35 will be performed until when the stack temperature Ts exceeds the upper limit temperature Tmax.

In Step S513, the control unit 6 stops the heating device 35 and closes the control valve 232 to stop the fuel supply to the heating device 35. Thus, the stack temperature Ts will increase up to the upper limit temperature Tmax. Accordingly, since the stack temperature Ts will increase up to the upper limit temperature Tmax, the stack temperature Ts constantly becomes the temperature appropriate for the electric generation. Thus, the period needed to the transition from the IS operating state to the electric generation operating state can be shortened.

Figure 6:
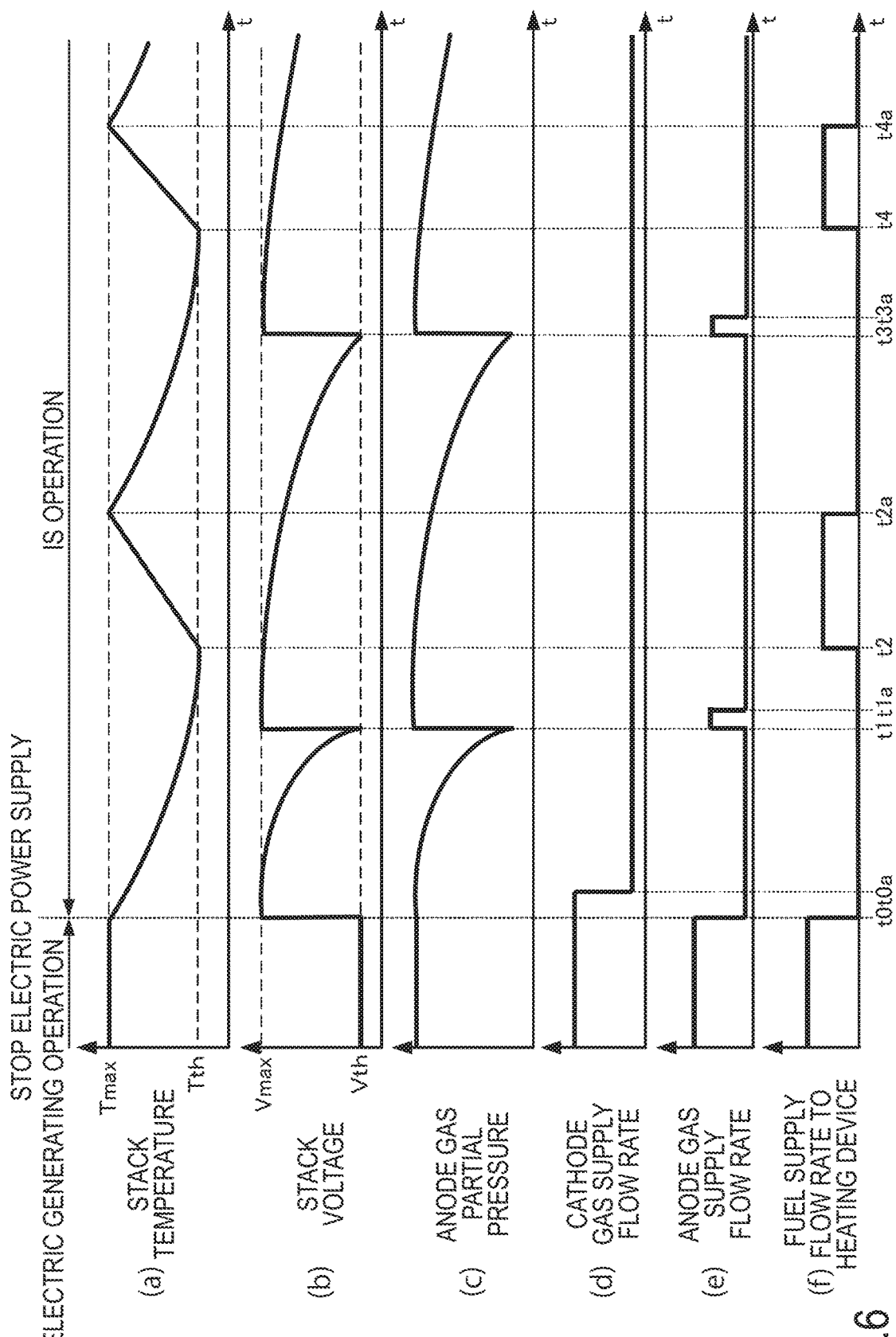
FIG. 6 is a view illustrating time series variation in the fuel cell system.

FIG. 6 is a timing chart illustrating a control method of an IS operation according to this embodiment.

When FIG. 6 is compared with FIG. 4 illustrating the timing chart in the first embodiment, a difference is that FIG. 6(f) illustrates a change in the supply flow rate of the fuel to the heating device 35, while FIG. 4(f) illustrates the change in the stack current. The following describes only the control at the times t0, t2, and t2a when the fuel supply amount illustrated in FIG. 6(f) changes. It should be noted that, at times t4 and t4a, processes similar to those at the respective times t2 and t2a are performed.

Referring to FIG. 6(f), when the IS operation request is issued at the time t0, the control unit 6 closes the control valve 232 to stop the fuel supply to the heating device 35. Therefore, the decrease of the anode gas partial pressure illustrated in FIG. 6(c) and the decrease of the stack voltage Vs illustrated in FIG. 6(b) are started. As illustrated in FIG. 6(a), the decrease of the stack temperature Ts is also started.

Then, at the time t2, as illustrated in FIG. 6(a), the stack temperature Ts becomes equal to or less than the threshold temperature Tth (S36: No). At the time t2, as illustrated in FIG. 6(f), the control unit 6 activates the heating device 35 and opens the control valve 232 to start the fuel supply to the heating device 35 (S512). The cathode gas heated by the heating device 35 is supplied to the fuel cell stack 1, thus starting the increase of the temperature of the fuel cell stack 1 as illustrated in FIG. 6(a).

Afterwards, at the time t2a, as illustrated in FIG. 6(a), the stack temperature Ts becomes the upper limit temperature Tmax (S511: Yes). At the time t2a, as illustrated in FIG. 6(f), the control unit 6 stops the heating device 35 and closes the control valve 232 to stop the fuel supply to the heating device 35 (S513). Therefore, as illustrated in FIG. 6(a), the increase of the stack temperature Ts is stopped.

It should be noted that the fuel cell stack 1 does not perform the electric generation (the electrochemical reaction) between the time t2 and the time t2a. Here, in the first embodiment illustrated in FIG. 4(b), the stack voltage Vs has temporarily reduced caused by the electric generation of the fuel cell stack 1 between the time t2 and the time t2a. However, in this embodiment illustrated in FIG. 6(b), since the fuel cell stack 1 does not perform the electric generation between the time t2 and the time t2a, the temporal reduction of the stack voltage Vs does not occur. Accordingly, the anode gas partial pressure illustrated in FIG. 6(c) also does not temporarily reduce.

With the fuel cell system 10 in the second embodiment, the following effect can be obtained.

With the fuel cell system 10 in the second embodiment, a heating and combusting step (S512) that operates the heating device 35 is performed in the temperature maintenance step. When the fuel is supplied to the heating device 35, the cathode gas that passes through the cathode gas supply passage 33 is heated by the heating device 35, and then supplied to the fuel cell stack 1. Then, the temperature of the fuel cell stack 1 increases, and the conductivity of the oxygen ion is ensured in the electrolyte layer, thus allowing the fuel cell stack 1 to appropriately perform the electric generation. Accordingly, the delay in the transition from the self-sustained operating state to the electric generation operating state can be reduced.

The embodiments of the present invention described above are merely illustration of some application examples of the present invention and not of the nature to limit the technical scope of the present invention to the specific constructions of the above embodiments.

For example, the IS operation is performed when the required electric power of the load device 90 becomes zero. However, insofar as a condition that the electric power supply from the fuel cell system to the load device 90 is stopped, the IS operation may be performed even when the required electric power to the fuel cell stack is a predetermined value larger than zero.

It should be noted that the above-described embodiments may be appropriately combined.

The present application claims a priority of Japanese Patent Application No. 2015-253887 filed with the Japan Patent Office on Dec. 15, 2015, and all the contents of which are hereby incorporated by reference.

The invention claimed is:

1. A control method for a fuel cell system including a solid oxide fuel cell, an anode gas and a cathode gas being supplied to the fuel cell, the fuel cell performing electric generation corresponding to a load, the fuel cell system controlling gas supply to the fuel cell and the electric generation, the control method comprising:
   an electric generating operation step of controlling flow rates of the anode gas and the cathode gas that flow into the fuel cell depending on a magnitude of the load; and
   a self-sustained operation step of causing the fuel cell to perform self-sustained operation when the load is equal to or less than a predetermined value, wherein:
   the self-sustained operation step includes a gas supply step of supplying the anode gas with a predetermined flow rate and the cathode gas with a predetermined flow rate to the fuel cell, and
   the control method supplies the cathode gas to the fuel cell with a flow rate that maintains an electric potential of a cathode electrode of the fuel cell and does not induce a drop in a voltage output from the fuel cell due to a shortage of the cathode gas, such that all the anode gas reacts inside the fuel cell, and supplies the anode gas with a flow rate that reduces transmission to an anode electrode of the cathode gas inside the fuel cell in the gas supply step, such that the voltage output from the fuel cell can be controlled by the anode gas.

2. The control method for the fuel cell system according to claim 1, wherein
   the self-sustained operation step further includes a voltage maintenance step of changing the flow rate of the anode gas corresponding to the voltage output from the fuel cell.

3. The control method for the fuel cell system according to claim 2, wherein the control method increases the flow rate of the anode gas to cause the voltage output from the fuel cell to become an upper limit value when the voltage output from the fuel cell falls below a lower limit value in the voltage maintenance step.

4. The control method for the fuel cell system according to claim 1, wherein the self-sustained operation step further includes a temperature maintenance step of maintaining a temperature of the fuel cell in a temperature range where the fuel cell ensures the electric generation.

5. The control method for the fuel cell system according to claim 4, wherein
the temperature maintenance step includes an electric power supply step of causing the fuel cell to perform the electric generation to supply electric power from the fuel cell when the temperature of the fuel cell falls below a lower limit value, and stopping the electric generation of the fuel cell when the temperature of the fuel cell exceeds an upper limit value.

6. The control method for the fuel cell system according to claim 5, wherein:
the fuel cell system further includes an auxiliary machine, and
the control method supplies the electric power from the fuel cell to the auxiliary machine in the electric power supply step.

7. The control method for the fuel cell system according to claim 5, wherein
a flow rate of the cathode gas in the electric power supply step is less than a flow rate of the cathode gas in the electric generating operation step.

8. The control method for the fuel cell system according to claim 4, wherein:
the fuel cell system further includes an activation heater disposed on a flow passage that supplies the cathode gas to the fuel cell, and
the temperature maintenance step includes an activation heating step of activating the activation heater.

9. The control method for the fuel cell system according to claim 1, wherein:
the fuel cell system further includes a discharged air combustor that mixes an anode off-gas and a cathode off-gas that are discharged from the fuel cell to combust the mixed gas, and
the self-sustained operation step further includes a discharged air combusting step of activating the discharged air combustor.

10. A fuel cell system comprising:
a fuel cell to which an anode gas and a cathode gas are supplied, the fuel cell being a solid oxide fuel cell;
a gas supply device that supplies the anode gas and the cathode gas to the fuel cell;
an electric power controller that extracts electric power from the fuel cell to supply the electric power to a battery or a motor; and
a control unit that performs electric generating operation of the fuel cell on the basis of a load required for the fuel cell, wherein
the control unit stops electric power supply from the fuel cell system to the load, supplies the anode gas to an anode of the fuel cell from the gas supply device with a flow rate that reduces transmission to an anode electrode of the cathode gas inside the fuel cell, such that a voltage output from the fuel cell can be controlled by the anode gas, and supplies the cathode gas with a flow rate that maintains an electric potential of a cathode electrode of the fuel cell to a cathode of the fuel cell from the gas supply device and does not induce a drop in the voltage output from the fuel cell due to a shortage of the cathode gas, such that all the anode gas reacts inside the fuel cell when the load becomes equal to or less than a predetermined value.

* * * * *